United States Patent
Beetz et al.

(10) Patent No.: US 6,951,341 B1
(45) Date of Patent: Oct. 4, 2005

(54) STABILIZER FOR A MOTOR VEHICLE

(75) Inventors: Stefan Beetz, Barnin (DE); Klaus Reichel, Domsühl (DE)

(73) Assignee: ZF Lemforder Metallwaren AG., Lemforder (DE)

( * ) Notice: Subject to any disclaimer, the term of this patent is extended or adjusted under 35 U.S.C. 154(b) by 128 days.

(21) Appl. No.: 09/980,898

(22) PCT Filed: May 18, 2000

(86) PCT No.: PCT/DE00/01558

§ 371 (c)(1),
(2), (4) Date: Jan. 30, 2002

(87) PCT Pub. No.: WO00/71371

PCT Pub. Date: Nov. 30, 2000

(30) Foreign Application Priority Data

May 20, 1999 (DE) ................................ 199 23 100

(51) Int. Cl.[7] ............................................. B60G 21/05
(52) U.S. Cl. ........................... 280/5.511; 280/124.106
(58) Field of Search ...................... 280/5.511, 124.106, 280/124.107, 124.152, 5.506

(56) References Cited

U.S. PATENT DOCUMENTS

| 4,206,935 | A | | 6/1980 | Sheppard et al. |
| 4,919,444 | A | * | 4/1990 | Leiber et al. ............. 280/5.511 |
| 5,076,605 | A | * | 12/1991 | Umeda ................. 280/124.107 |
| 5,141,088 | A | * | 8/1992 | Kurihara et al. ......... 192/69.41 |
| 5,251,926 | A | * | 10/1993 | Aulerich et al. ....... 280/124.152 |
| 5,437,354 | A | * | 8/1995 | Smith ...................... 188/266.1 |
| 5,480,186 | A | * | 1/1996 | Smith ....................... 280/5.511 |
| 5,505,480 | A | * | 4/1996 | Pascarella ............ 280/124.106 |
| 5,529,324 | A | * | 6/1996 | Krawczyk et al. ..... 280/124.106 |
| 5,549,328 | A | * | 8/1996 | Cubalchini ............... 280/5.511 |
| 6,022,030 | A | * | 2/2000 | Fehring ................... 280/5.511 |
| 6,149,166 | A | * | 11/2000 | Struss et al. ............. 250/5.511 |
| 6,328,323 | B1 | * | 12/2001 | Elser ................... 280/124.152 |
| 6,361,033 | B1 | * | 3/2002 | Jones et al. ................. 267/187 |
| 6,428,019 | B1 | * | 8/2002 | Kincad et al. ........... 280/5.511 |
| 6,439,583 | B1 | * | 8/2002 | Markowetz .............. 280/5.511 |

FOREIGN PATENT DOCUMENTS

| DE | 2053649 | 5/1972 |
| DE | 2817712 | 10/1979 |
| GB | 2220625 | 1/1990 |
| JP | 02185818 | 7/1990 |

* cited by examiner

Primary Examiner—Paul N. Dickson
Assistant Examiner—Laura B. Rosenberg
(74) Attorney, Agent, or Firm—Horst M. Kasper

(57) ABSTRACT

The invention relates to a stabilizer for a motor vehicle. Known one-piece stabilizers are designed either solely for operation in road traffic or solely for off-road operation. Two-piece stabilizers that comprise an engaging and disengaging clutch have disadvantages regarding quality and safety. The invention provides a clutch, drivers (14, 17) of which form at least two adjustable gaps in the peripheral direction. The gaps can be filled by at least two locking elements (25) that can be displaced to a certain extent. The locking elements (25) and said drivers (14, 17) are constantly in positive engagement with one another in the peripheral direction and are adjusted to one another in such a manner that the locking elements (25) and the drivers (14, 17) are interlocked without play in the locked final position and that they can be rotated towards one another across a limited angle in the unlocked final position.

17 Claims, 4 Drawing Sheets

STABILIZER FOR A MOTOR VEHICLE

CROSS-REFERENCE TO RELATED APPLICATIONS (not applicable)

Figure 1:
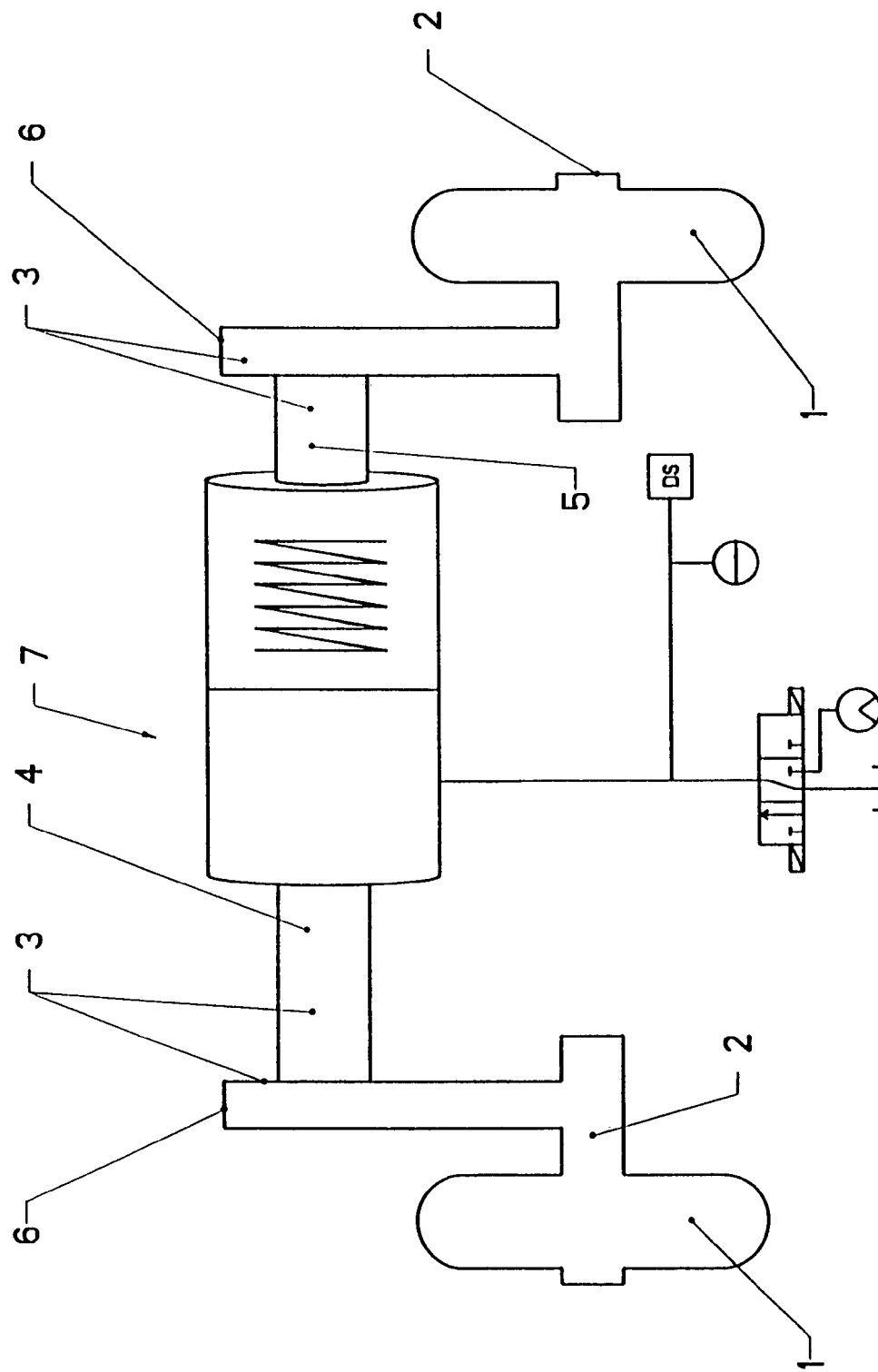

STATEMENT REGARDING FEDERALLY SPONSORED RESEARCH OR DEVELOPMENT (not applicable)

INCORPORATION-BY-REFERENCE OF MATERIAL SUBMITTED ON A COMPACT DISC (See 37 CFR 1.52(e)(5) and MPEP 608.05. Computer program listings (37 CFR 1.96(c)), "Sequence Listings" (37 CFR 1.821(c)), and tables having more than 50 pages of text are permitted to be submitted on compact discs.) or REFERENCE TO A "MICROFICHE APPENDIX" (See MPEP § 608.05(a). "Microfiche Appendices" were accepted by the Office until Mar. 1, 2001.)

(not applicable)

BACKGROUND OF THE INVENTION (1) Field of the Invention

The invention relates to a stabilizer with the features of the preamble of claim 1.

(2) Description of Related Art including information disclosed under 37 CFR 1.97 and 1.98.

Such stabilizers are employed in motor vehicle technology.

In principle a stabilizer working according to the torsion bar principle is coordinated to each axle of a motor vehicle, wherein the stabilizer runs parallel to the axle and is attached at two ends at a wheel suspension. These stabilizers have the task to prevent or, respectively, diminish the transfer of rolling motions caused by the road situation and starting at the wheels onto the vehicle. Such rolling motions are generated mainly in the curves of the road or at the unevenness of the road, such as for example potholes or ruts.

Single part stabilizers exist, which are constructed in their dimensioning and in their material properties such that they receive torsion forces of a predetermined order of magnitude and that they can furnish corresponding counter forces. Single part stabilizers react however to different loads either too soft or too hard, which is disadvantageous for the driving comfort and single part stabilizers cannot accept increased loads.

Therefore increasingly two part stabilizers are employed, wherein the two part stabilizers are connected to each other by an axially fixed and rotary elastical clutch. Such a clutch is shown for example in the German printed patent DE 43 42 360 C2, wherein a rubber spring element is interposed between the two stabilizer parts. This rubber spring elements exhibits a softer spring constant and the thereby increases the possible twist angle between the two stabilizers. This way larger road loads can be opposed. The twist angle however is insufficient in case of road unevenness problems acting extremely different onto the wheels, such as they occur cross-country. In addition a slippage exists between the two stabilizer parts because of the rubber spring element, which operates disadvantageously onto the driving behavior in case of a straight driving and planar road.

Increasingly two part stabilizers with a switchable clutch are employed for such extreme load situations, such as there are described for example in the German printed patent document DE 19705809 A1. This coupling is furnished as a friction clutch and is controlled hydraulically depending on the load of the wheels. The two halves of the clutch are frictionally engaged connected in case of a high outer load and are separated in case of a lacking load. A slippage occurs between the two stabilizer halves upon a small load of the wheels. Such friction clutches are not safe, since also a slippage of the clutch cannot be excluded in the closed position and since an unlimited twist angle is possible in the separated position under an exclusion of the stabilizer function. This is a safety risk.

There exists no switchable clutch in all known constructions, which connects the two stabilizer halves without play in the block condition and which safely separates the two stabilizer halves in the released condition and which admits only a limited twist angle of as desired plus/minus 40 degrees in the released state.

BRIEF SUMMARY OF THE INVENTION

Therefore, it is an object of the invention to develop a stabilizer of the kind recited, which eliminates the recited disadvantages of the state-of-the-art and which automatically closes in a fail-safe-situation and which does not automatically separate in a coupled state.

This object is accomplished by the characterizing features of claim 1.

Advantageous embodiments of the invention result from the features of the claims 2 through 10.

The invention eliminates the recited disadvantages of the state of the art. A particular advantage results therefrom that the two radial catches are disposed on a common plane and also remain in a common plane in each operating state and that only the adjustment piston with its locking elements is disposed axially shiftable. A play free and slippage free connection of the two stabilizer parts occurs thereby in the coupled state. No further force transfer planes, which would shorten the effective length of the stabilizer parts, exist as a result of the arrangement of the two radial catches in the common plane.

The invention is to be explained in more detail in the following by way of an embodiment.

BRIEF DESCRIPTION OF THE SEVERAL VIEWS OF THE DRAWING(S)

Figure 2:
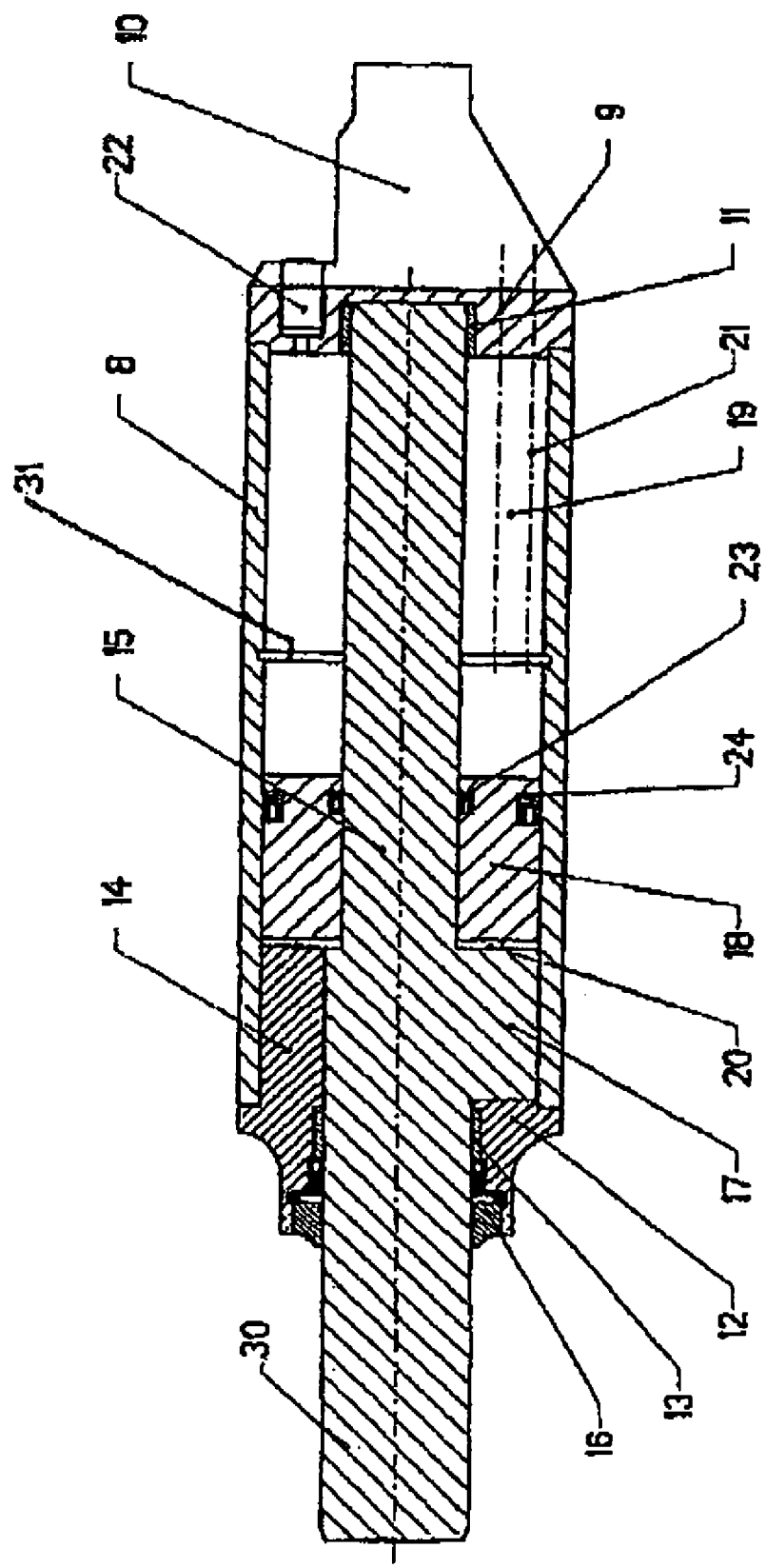
Figure 3:
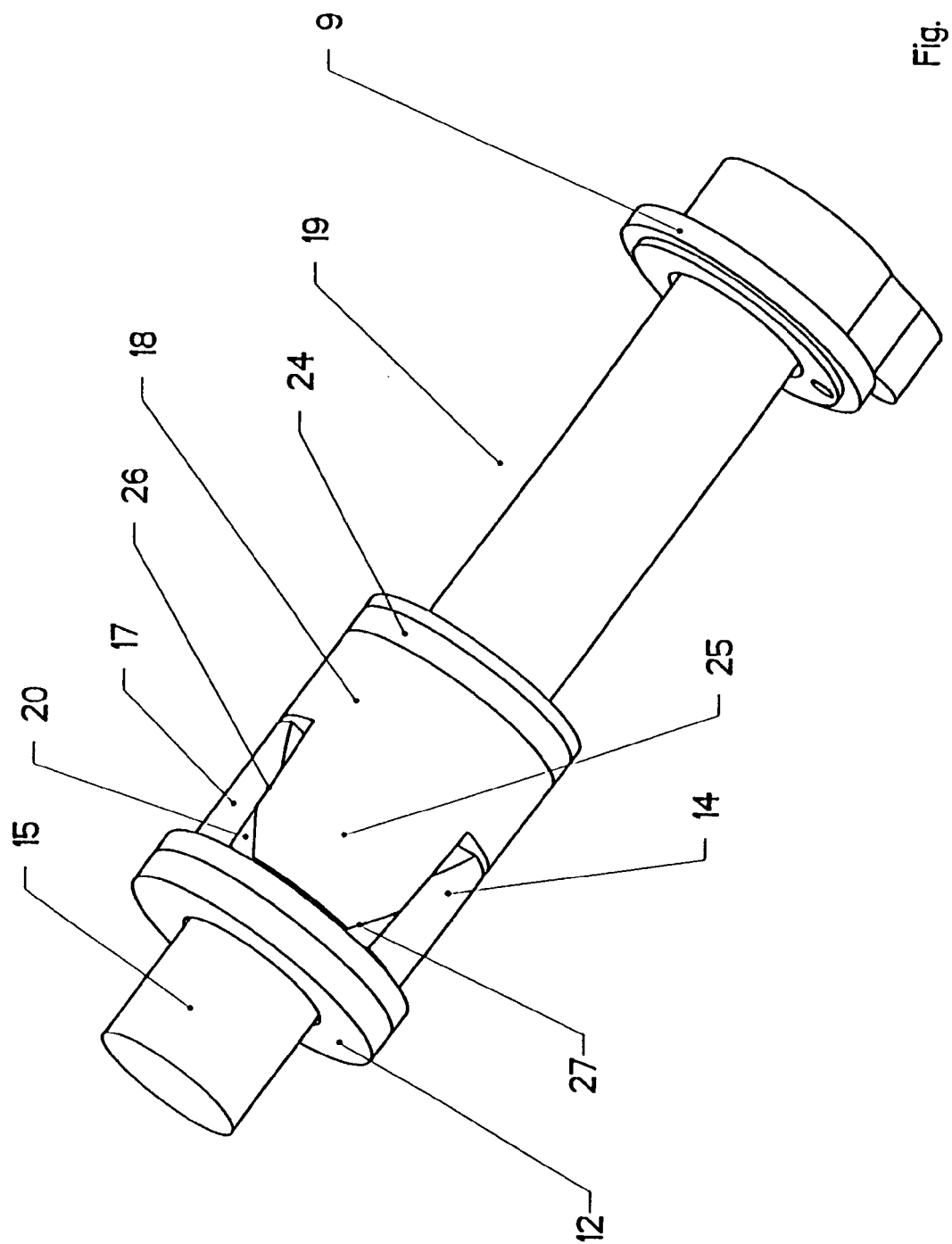

There is shown in:

FIG. 1 a simplified presentation of a vehicle axle with a stabilizer,

FIG. 2 the invention clutch in a sectional view,

FIG. 3 the clutch in a locked state, and

Figure 4:
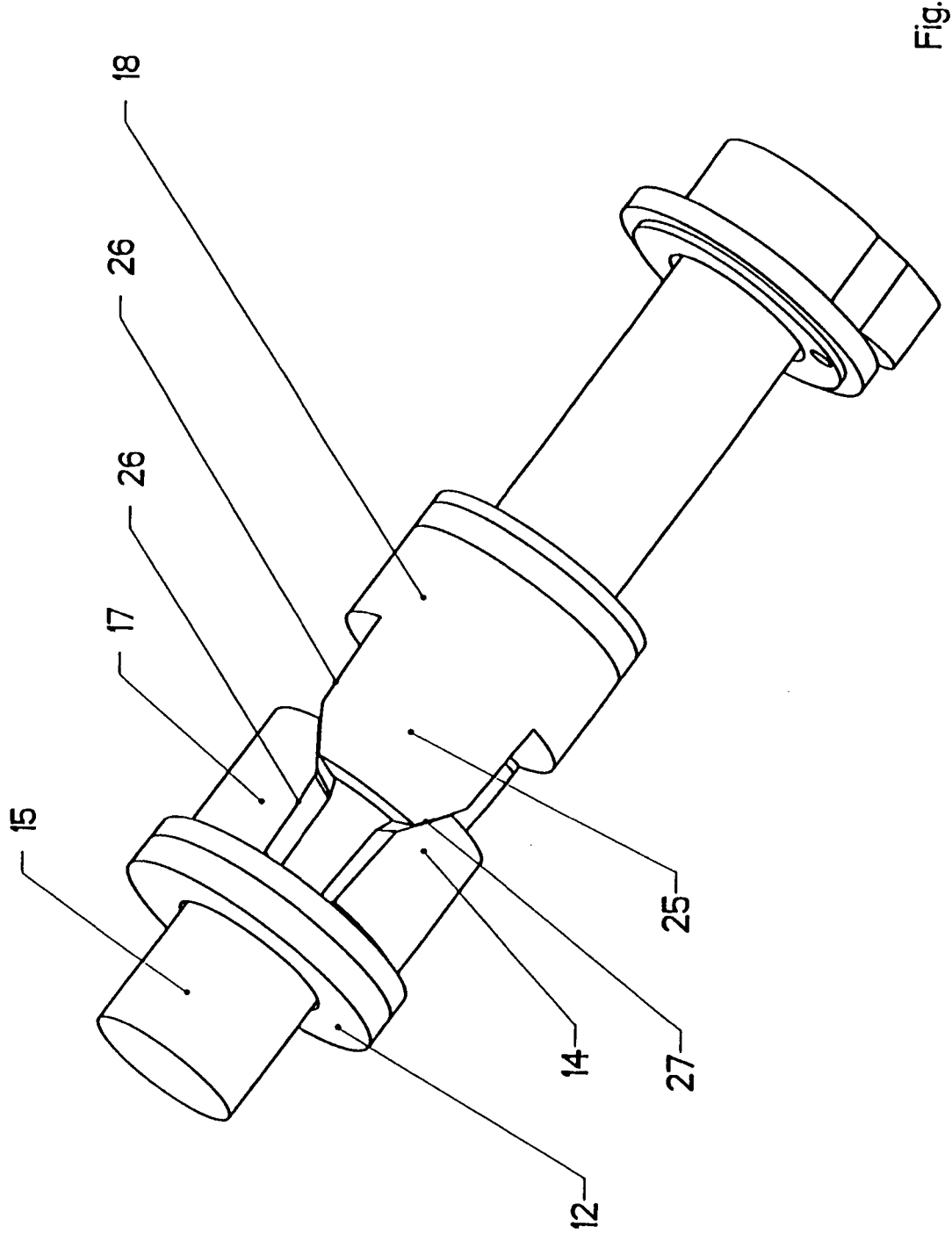

FIG. 4 the clutch in an unlocked state in the position of a maximum twist angle with a presentation of the rotary angle limitation.

DETAILED DESCRIPTION OF THE INVENTION

Each axle of a motor vehicle comprises according to FIG. 1 in principle the two wheels 1 and one supporting axle 2 carrying the two wheels 1. A subdivided stabilizer 3 with its two stabilizer parts 4 and 5 is disposed parallel to the axle 2, wherein each stabilizer part 4, 5 is connected with a wheel suspension not illustrated of the corresponding wheel 1 and on the other hand to the vehicle body for support position 6. A clutch 7 is disposed between the two stabilizer parts 4 and 5, wherein the clutch 7 connects to each other or separates from each other the two stabilizer parts 4, 5 to a straight continuous stabilizer 30 through a gearing. The connected stabilizer 3 is adjusted in its dimensioning and in its material properties to receive torsion forces introduced through the wheels 1 and to build up corresponding counter forces. These forces are thereby not transferred or at least dampened onto the vehicle body.

The clutch 7 is constructed axially switchable and shape matching. For this purpose the clutch 7 comprises a cylindrical casing 8 with a closed floor 9, wherein a connection pin 10 for one of the two stabilizer parts 4, 5 connects to the closed floor 9. The bearing position 11 for rotary hinge is disposed on the inner side of the floor 9. The casing 8 is disposed opposite to the floor 9 and is closed fixed against rotation with a cover 12, wherein the cover is furnished with the straight continuous bearing bore hole 13 for a further rotary hinge and with a radial catch 14 protruding into the interior of the cylindrical casing 8. The radial catch 14 is disposed in a radial space between the straight continuous bearing bore hole 13 and the inner wall of the cylindrical casing 8. The radial catch 14 can also be directly connected to the cylindrical casing 8 at the same arrangement. Furthermore a shaft 15 is fitted into the casing 8, wherein the shaft 15 penetrates the interior of the cylindrical casing 8 and on the one hand is rotatably supported in the bearing position 11 in the floor 9 of the casing 8 and on the other hand in the bearing bore hole 13 in the cover of the casing 8. The shaft 15 is connected to the other stabilizer part 4, 5 with the outer disposed pin of the shaft 15. The bearing bore hole 13 in the cover 12 is sealed to the outside by corresponding sealing elements 16. A further radial catch 17 is disposed on the shaft 15, wherein the further radial catch 17 is rotatable with the shaft 15 and is disposed and formed in the same way as the radial catch 14 at the cylindrical casing 8. The radial catch 14 rests thereby at the cylindrical casing 8 and the radial catch 17 rests thereby on the shaft 15 in a common plane, whereby the two radial catches 14 and 17 are swivelable relative to each other only to a limited extent.

Furthermore a hydraulically actuatable locking piston 18 is disposed in the interior of the cylindrical casing 8, wherein the hydraulically actuatable locking piston 18 is guided axially shiftable and radially rotatable on the shaft 15 and wherein the hydraulically actuatable locking piston 18 subdivides the inner space of the cylindrical casing 8 on the floor side into a pressure spring chamber 19 and on the cover side into a pressure chamber 20. A compression spring 21 is inserted into the pressure spring chamber 19, wherein the compression spring 21 is supported at the floor 9 of the casing 8 and wherein the compression spring 21 loads the locking piston 18. The pressure spring chamber 19 is connected to a hydraulic tank through a leakage oil connector 22. In contrast, the pressure chamber 20 is furnished with a connection to a hydraulic pressure oil supply plant through a pressure oil connector not illustrated. The locking piston 18 is further furnished with an internal sealing element 23 and with an external sealing element 24, which sealing elements 23, 24 hydraulically seal the pressure chamber 20 against the pressure spring chamber 19.

Two locking elements 25 are formed on the cover side of the locking piston 18, wherein the two locking elements 25 are disposed in the radial free space between the shaft 15 and the wall of the casing 8 in the same way as the two radial catches 14 and 17 and wherein the two locking elements 25 are disposed opposite to each other, that is staggered by 180 degrees. The shape and the dimensions of the two locking elements 25 are tuned in a particular way to the shapes and dimensions of the two radial catches 14 and 17.

Thus the two locking elements 25 have a width which fills without play the two caps between the two radial catches 14 and 17 and the two locking elements 25 have a length, which allows an engagement of the locking elements 25 in the region of the two radial catches 14, 17 in the one end position of the adjustment piston 18. Furthermore the locking piston 18 is furnished with a stroke limitation (31), wherein this stroke limitation prevents that the two radial catches 14, 17 and the two locking elements 25 become disengaged in the other end position of the locking piston 18. Therefore, furthermore a positive longitudinal covering of the radial catches 14, 17 and of the locking elements 25 of the locking piston 18 exists in this end position.

The contact faces of the two catches 14, 17 and of the two locking elements 25 disposed opposite to each other and communicating with each other are composed in each case out of a conical face 26 with a smaller angle and a conical face 27 with a larger angle, wherein the conical face 26 with the smaller angle exhibits a larger axial length as compared to the conical face 27 with the larger angle and wherein the conical face 27 with the larger angle is disposed at the respective end of the catches 14, 17 or, respectively, of the locking elements 25.

The conicity of the conus face 26 with the smaller angle allows a connection always free of play of the two catches 14, 17 and of the two locking elements 25. Here the conical angle is selected such that the axial force component of a radial force entered from the outside does not surpass the spring force of the compression spring 21.

The conical face 27 with the larger angle has an angle of about 45 degrees. The two radial catches 14, 17 obtain a radial play region in the opened position of the locking piston 18 based on the larger cone and based on the longitudinal covering of the two catches 14, 17 and the two locking elements 25 caused by the stroke limitation, wherein the radial play region is limited at two sides by having one of the two radial catches 14, 17 being supported at the other radial catch 14, 17 through in each case one of the two locking elements 25. This state is shown in FIG. 4. The twist angle possible thereby between the two stabilizer parts 4 and 5 can be adapted to the most different situations of application and amounts to preferably 40 degrees.

The pressure chamber 20 in the cylindrical case 8 is maintained free from pressure under standard road conditions, for example in the street traffic, such that the compression spring 21 loads the adjustment piston 18 and shifts the adjustment piston 18 in the direction of the radial catches 14, 17.

Side contacts between the radial catches 14, 17 and the two locking elements 25 occur. The radial catches 14, 17 are thereby centered and the locking piston 18 is also rotatable such that the two locking elements 25 penetrate to such extent into the intermediate spaces between the two radial catches 14, 17 until the conical faces 26 with the smaller angle come to rest. The locking piston 18 is held in this position by the force of the compression spring 21 over the full load range. The stabilizer parts 4, 5 coupled in this manner behave here like a single part stabilizer.

In case of nonstandard road conditions, as they occur for example cross-country, the torsion region of the coupled stabilizer 3 is not any longer sufficient in order to balance the rolling motions of the wheels. In such cases the pressure chamber 20 of the clutch is subjected to pressure by actuating a pressure supply plant preferably operated hydraulically, such that the locking piston 18 disengages from the contact region of the conical face 26 with the smaller angle against the force of the compression spring 21 and that the locking piston 18 shifts into its end position defined by the stroke limitation. The locking piston 18 is maintained in this position by maintaining the hydraulic pressure in the pressure chamber 20. Thus the two stabilizer parts 4, 5 are separated, however the two stabilizer parts 4, 5 remain freely rotatable relative to each other over a predetermined swivel region. One of the two radial catches 14, 17 in the region of the conical faces 27 with larger angle comes into contact with a locking element 25 and rotates the locking element 25 until the locking element 25 is supported at the conical face 27 with the larger angle of the other one of the two catches 14, 17 in case of different loads of the two wheels of an axle. The two stabilizer parts 4, 5 are again connected to each other in this coupling state such that the two stabilizer parts 4, 5 are in a position to receive torsional forces. The relative twist motion of the two radial catches 14, 17 is dampened in an advantageous way by the hydraulic liquid in the pressure chamber 20 subjected to pressure.

Of course, the hydraulic plant for activating the locking piston 18 can be constructed such that the force of the compression spring 21 is hydraulically supported which leads to an acceleration of the coupling process. The effect of the compression spring remains in case of a failure of the hydraulic plant, wherein the compression spring maintains the couple state or induces the coupled state.

LIST OF REFERENCE CHARACTERS 1 wheel
2 axle
3 stabilizer
4 stabilizer part
5 stabilizer part
6 bearing position
7 clutch
8 cylindrical casing
9 floor
10 connection pin
11 bearing position
12 cover
13 bearing bore hole
14 radial catch
15 shaft
16 sealing element
17 radial catch
18 locking piston
19 compression spring chamber
20 pressure chamber
21 compression spring
22 leakage oil connector
23 internal sealing element
24 outer sealing element
25 locking element
26 conical face with a smaller angle
27 conical face with a larger angle

What is claimed is:

1. Stabilizer for a motor vehicle comprising two stabilizer parts (4, 5) aligned parallel to an axle (2), wherein the stabilizer parts (4, 5) are each connected at a wheel suspension of one wheel (1) and to a vehicle body through a bearing position (6) and wherein the two stabilizer parts (4, 5) are connectable to each other through a switchable and shape matching coupling, characterized in that the coupling is furnished with at least one first catch (14) and with at least one second catch (17), wherein the two catches form at least two changeable intermediate spaces in a circumferential direction, and the intermediate spaces can be filled by at least two locking elements (25) shiftable to a limited extent for force transmission, wherein the locking elements (25) and the catches (14, 17) are standing in continuous positive covering in circumferential direction and are tuned to each other such that the locking elements (25) and the catches (14, 17) are geared to each other without play in a locked end position and are standing in positive covering relative to each other in a released end position and are rotatable relative to each other over a limited angle region in the released end position.

2. Stabilizer according to claim 1, wherein the at least one first catch (14) and the at least one second catch (17) are disposed fixed and non-relocatable relative to the stabilizer part in a direction parallel to the axle (2).

3. Stabilizer for a motor vehicle comprising two stabilizer parts (4, 5) aligned parallel to an axle (2), wherein the stabilizer parts (4, 5) are each connected at a wheel suspension of one wheel (1) and to a vehicle body through a bearing position (6) and wherein the two stabilizer parts (4, 5) are connectable to each other through a switchable and shape matching coupling, characterized in that the coupling is furnished with at least one first catch (14) and with at least one second catch (17), wherein the two catches form at least two changeable intermediate spaces in a circumferential direction, and the intermediate spaces can be filled by at least two locking elements (25) shiftable to a limited extent for force transmission, wherein the locking elements (25) and the catches (14, 17) are standing in continuous positive covering in circumferential direction and are tuned to each other such that the locking elements (25) and the catches (14, 17) are geared to each other without play in a locked end position and are standing in positive covering relative to each other in a released end position and are rotatable relative to each other over a limited angle region in the released end position, and wherein the catches (14, 17) are directed radially inwardly and are disposed in a radial plane and wherein the locking elements (25) are associated with a pressure loaded locking piston (18), wherein the catches (14, 17) and the locking piston (18) are disposed on a common axis.

4. Stabilizer according to claim 3 characterized in that side contact faces of the catches (14, 17) and the locking element (25) are formed as conical faces (26) with a smaller angle and wherein radial stops are formed at the catches (14, 17) for the locking element (25).

5. Stabilizer according to claim 4 characterized in that the radial stops are disposed at free ends of the catches (14, 17).

6. Stabilizer according to claim 5 characterized in that conical faces (27) with a larger angle are furnished as radial stops, wherein the axial length of the conical faces (27) with a larger angle are smaller relative to the length of the conical faces (26) with a smaller angle.

7. Stabilizer according to claim 6 characterized in that the conical faces (26) with the smaller angle have an angle which maintains an axial force component of a radial introduced outer force smaller than a force acting on a floor side of the locking piston (18).

8. Stabilizer according to claim 7 characterized in that the catches (14, 17) and the locking piston (18) are disposed in a common cylindrical casing (8), wherein the at least one second catch (17) is formed at the casing (8) and wherein the at least one first catch (14) is formed at a shaft (15) supported in the casing (8) and penetrating to the outside and wherein the locking piston (18) separates the internal space of the cylindrical casing (8) into a compression spring chamber (19) and an oppositely disposed pressure chamber (20).

9. Stabilizer according to claim 8 characterized in that a floor (9) of the cylindrical casing (8) on the side of the compression spring is formed as a stroke limitation for the locking piston (18). fixed and non-relocatable relative to the stabilizer part in a direction parallel to the axle (2).

10. Stabilizer according to claim 3 characterized in that the locking piston (18) is charged by a compression spring (21) in the direction of the catches (14, 17) and is impactable by a pressure medium in an opposite direction.

11. Stabilizer according to claim 10 characterized in that the compression spring is supported by a hydraulic force.

12. A stabilizer for a motor vehicle comprising a first stabilizer part (4) aligned parallel to an axle (2), wherein the first stabilizer part (4) is to be connected at a first wheel suspension of a first wheel (1) and to a vehicle body through a first bearing position (6); a second stabilizer part (5) aligned parallel to the axle (2), wherein the second stabilizer part (5) is to be connected at a second wheel suspension of a second wheel (1) and to the vehicle body through a second bearing position (6);
   a switchable and shape matching coupling for connecting the first stabilizer part (4) to the second stabilizer part (5);
   a first catch (14) furnished at the coupling;
   a second catch (17) furnished at the coupling, wherein the first catch (14) and the second catch (17) form a first changeable intermediate space in a circumferential direction and a second changeable intermediate space in a circumferential direction;
   a first locking element (25) filling the first changeable intermediate space and shiftable to a limited extent in a direction parallel to the axle (2) for force transmission;
   a second locking element (25) filling the second changeable intermediate space and shiftable to a limited extent in a direction parallel to the axle (2) for force transmission, wherein
   the first locking element (25), the second locking element (25), the first catch (14) and the second catch (17) are standing in continuous positive overlap in a circumferential direction and are tuned to each other such that the first locking element (25) and the second locking element (25) are geared to the first catch (14) and to the second catch (17) without play in a locked end position and wherein the first locking element (25) and the second locking element (25) are standing in positive overlap relative to the first catch (14) and to the second catch (17) in a released end position and wherein the first locking element (25) and the second locking element (25) are rotatable relative to the first catch (14) and to the second catch (17) over a limited angle region in the released end position.

13. The stabilizer according to claim 12 further comprising
   a stroke limitation (31) furnished to the second stabilizer part (5) for limiting shifting of the first locking element (25) to the released end position.

14. The stabilizer according to claim 12 further comprising
   a compression spring (21) biasing the first locking element (25) toward the locked end position.

15. The stabilizer according to claim 12 further comprising
   a cylindrical casing (8) surrounding the first locking element (25) and the second locking element (25);
   a pressure chamber (20) formed between the first locking element (25) and the first catch (14) and the second catch (17);
   a pressure spring chamber (19) disposed between the first locking element (25) and the second stabilizer part (5);
   an outer sealing element (24) for hydraulically sealing the pressure chamber (20) against the pressure spring chamber (19).

16. The stabilizer according to claim 12 further comprising
   a cylindrical casing (8) surrounding the first locking element (25) and the second locking element (25);
   a pressure chamber (20) formed between the first locking element (25) and the first catch (14) and the second catch (17);
   a pressure spring chamber (19) disposed between the first locking element (25) and the second stabilizer part (5);
   an inner sealing element (24) for hydraulically sealing the pressure chamber (20) against the pressure spring chamber (19).

17. A stabilizer for a motor vehicle comprising
   a first stabilizer part (4) aligned parallel to an axle (2), wherein the first stabilizer part (4) is to be connected at a first wheel suspension of a first wheel (1) and to a vehicle body through a first bearing position (6);
   a second stabilizer part (5) aligned parallel to the axle (2), wherein the second stabilizer part (5) is to be connected at a second wheel suspension of a second wheel (1) and to the vehicle body through a second bearing position (6);
   a switchable and shape matching coupling for connecting the first stabilizer part (4) to the second stabilizer part (5);
   a first catch (14) furnished at the coupling;
   a second catch (17) furnished at the coupling, wherein the first catch (14) and the second catch (17) form a first changeable intermediate space in a circumferential direction and a second changeable intermediate space in a circumferential direction;
   a first locking element (25) filling the first changeable intermediate space and shiftable to a limited extent in a direction parallel to the axle (2) for force transmission;
   wherein
   the first locking element (25), the first catch (14) and the second catch (17) are standing in continuous positive overlap in a circumferential direction and are tuned to each other such that the first locking element (25) is geared to the first catch (14) and to the second catch (17) without play in a locked end position and wherein the first locking element (25) in standing in positive overlap relative to the first catch (14) and to the second catch (17) in a released end position and wherein the first locking element (25) is rotatable relative to the first catch (14) and to the second catch (17) over a limited angle region in the released end position.

* * * * *